United States Patent
Stelzig et al.

(10) Patent No.: US 7,245,593 B1
(45) Date of Patent: Jul. 17, 2007

(54) BUS STATION WITH ROUTING FOR SURVIVABLE NETWORKS

(75) Inventors: Wolfgang Stelzig, Ludwigsburg (DE); Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,388

(22) PCT Filed: Oct. 21, 1998

(86) PCT No.: PCT/DE98/03074

§ 371 (c)(1),
(2), (4) Date: Jul. 16, 2000

(87) PCT Pub. No.: WO99/22299

PCT Pub. Date: May 6, 1999

(30) Foreign Application Priority Data

Oct. 27, 1997 (DE) .............................. 197 47 322

(51) Int. Cl.
*H04B 7/14* (2006.01)
*H04J 1/10* (2006.01)
*H04J 3/08* (2006.01)
*H04J 3/00* (2006.01)
*H04L 12/43* (2006.01)

(52) U.S. Cl. .................. 370/315; 370/345; 370/458

(58) Field of Classification Search ............. 370/248, 370/403, 320, 238, 254, 419, 280, 315, 345, 370/458; 709/242
See application file for complete search history.

(56) References Cited

U.S. PATENT DOCUMENTS

| | | | | |
|---|---|---|---|---|
| 4,639,937 A | * | 1/1987 | McRae et al. ............... | 375/267 |
| 4,939,728 A | * | 7/1990 | Markkula et al. ........... | 370/419 |
| 5,297,137 A | | 3/1994 | Ofek et al. | |
| 5,369,745 A | * | 11/1994 | Faber .......................... | 709/240 |
| 5,394,436 A | * | 2/1995 | Meier et al. ................. | 375/132 |
| 5,473,606 A | | 12/1995 | Hoekstra | |
| 5,602,836 A | * | 2/1997 | Papadopoulos et al. ..... | 370/280 |
| 5,848,054 A | * | 12/1998 | Mosebrook et al. ........ | 370/226 |
| 5,907,540 A | * | 5/1999 | Hayashi ....................... | 370/315 |
| 5,926,101 A | * | 7/1999 | Dasgupta ............... | 340/825.02 |
| 5,978,364 A | * | 11/1999 | Melnik ........................ | 370/320 |
| 5,987,011 A | * | 11/1999 | Toh .............................. | 370/331 |
| 5,987,024 A | * | 11/1999 | Duch et al. .................. | 370/350 |
| 6,047,000 A | * | 4/2000 | Tsang et al. ................. | 370/412 |
| 6,201,794 B1 | * | 3/2001 | Stewart et al. ............... | 370/248 |
| 6,266,706 B1 | * | 7/2001 | Brodnik et al. ............. | 709/242 |
| 6,690,657 B1 | * | 2/2004 | Lau et al. .................... | 370/315 |

FOREIGN PATENT DOCUMENTS

| | | |
|---|---|---|
| DE | 195 39 259 | 4/1997 |
| WO | WO 97 29556 | 8/1997 |

* cited by examiner

*Primary Examiner*—Kevin C. Harper
(74) *Attorney, Agent, or Firm*—Kenyon & Kenyon LLP

(57) ABSTRACT

A bus station or a communication system is described, where the bus stations receive communications containing transmission information from which the position of the transmitting bus station in a sequence of bus stations can. A time slot for the bus station in which the bus station repeats the received communication is calculated from the transmission information and position information stored in the bus station indicating the position of the bus station in the sequence. These bus stations are especially suitable for data exchange by radio.

10 Claims, 2 Drawing Sheets

BUS STATION WITH ROUTING FOR SURVIVABLE NETWORKS

BACKGROUND INFORMATION

The present invention concerns a bus station for communication with other bus stations, where the exchange of communications between the bus stations is preferably accomplished by radio signals. There are already communication systems where communications are exchanged by radio signals, such as DECT and GSM, where a transmission between individual stations is controlled from a central office.

SUMMARY OF THE INVENTION

The bus station according to the present invention or the communication system created with it has the advantage that simple tuning of the bus stations takes place through the data exchange. Therefore, failure of individual bus stations or communications links between the bus stations can be tolerated. The system can be assembled very easily, and bus stations can easily be added or removed. The bus stations are self-tuning over a time grid where a time slot for transmission of data is assigned to each bus station.

Due to the fact that a direction vector is provided, it is possible to ensure that a communication will be distributed to all bus stations regardless of where it occurs first in the communication system. The bus stations are also designed to relay communications from data sources. In addition, the bus stations may also be designed to monitor repeating of their communication by other bus stations. Thus, it is possible to ensure that a communication will reliably reach all bus stations of a communication system, in particular for bus stations having only a few communications links.

DETAILED DESCRIPTION

Figure 1:
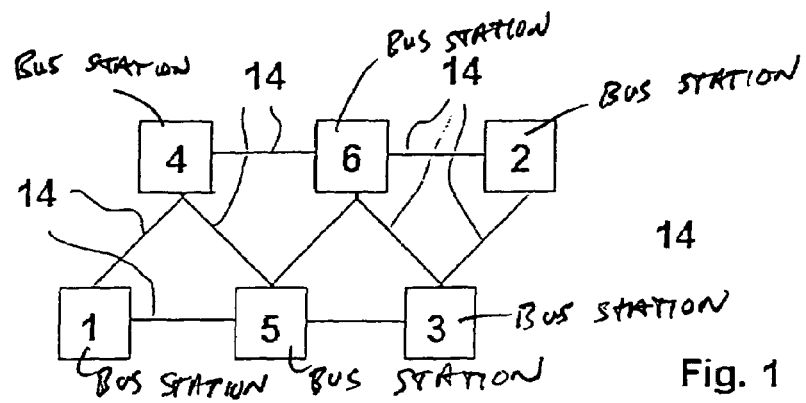
FIG. 1 shows a communication system having six bus stations.

FIG. 1 shows a communication system composed of six bus stations. These bus stations are each labeled with a number from 1 to 6. Bus stations 1 through 6 are connected by communications links 14. Communications links 14 are intended in particular for data exchange between the bus stations by a radio connection. Because of the spatial arrangement of the bus stations, a radio signal cannot reach all the bus stations but instead can reach only certain adjacent stations. This is illustrated by communications links 14 connecting only individual bus stations. Bus station 1 is connected to bus stations 4 and 5 by communications links 14. Bus station 2 is connected to bus stations 3 and 6 by communications links 14. Bus station 3 is connected to bus stations 2, 5 and 6 by communications links 14. Bus station 4 is connected to bus stations 1, 5 and 6 by communications links 14. Bus station 5 is connected to bus stations 1, 3, 4 and 6 by communications links 14. Bus station 6 is connected to bus stations 2, 3, 4 and 5 by communications links 14.

The numbers assigned to the bus stations here are stored in the bus stations and are important for the data exchange. The highest number assigned in the communication system is issued for the bus station with the highest number of communications links 14. In the example according to FIG. 1, bus stations 5 and 6 each have four communications links 14 with other bus stations, bus stations 3 and 4 each have three communications links 14 with other bus stations, and bus stations 2 and 1 each have two communications links 14 with other bus stations. Each number assigned to the bus stations is only issued once. Each bus station should have at least two communications links with other bus stations. This measure guarantees that even in the event of a failure of one communications link or failure of one of the bus stations, at least one communications link 14 to a functional bus station will remain intact. If there is a simultaneous failure of multiple bus stations and/or multiple communications links, however, it may happen that individual bus stations can no longer communicate with other bus stations. When a communication is transmitted, each bus station transmits simultaneously on all communications links 14 belonging to that bus station. A communication transmitted by bus station 1 thus reaches stations 4 and 5 at the same time. A communication transmitted by bus station 6 reaches stations 2, 3, 4 and 5 simultaneously. The bus station with the higher number thus reaches a much larger number of bus stations at the same time when a communication is transmitted. It is therefore desirable to always send communications starting from a bus station with a high reference number if possible.

Figure 2:
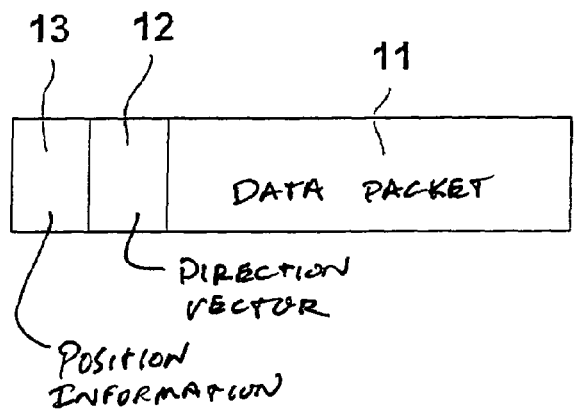
FIG. 2 shows the format of communications exchanged between bus stations.

FIG. 2 shows a schematic diagram of the structure of a communication such as that sent by bus stations 1 through 6. The communication has a data packet 11 representing the actual useful information. This data packet 11 contains the information that is to be exchanged with the help of the bus stations. In addition, position information 13 and a direction vector 12 are also provided, shown here at the beginning of the communication as an example. However, other arrangements of this information are also conceivable. The transmitting bus station can be determined by position information 13. This position information may include, for example, the number assigned to the individual bus stations in FIG. 1. However, any type of transmission information that makes it possible to determine the identity of the transmitting station is also possible.

The bus stations are assigned a certain sequence, which is indicated by one of the numbers from 1 to 6 in FIG. 1. The position information now makes it possible to determine the position of the transmitting bus station in relation to the other bus stations of the communication system shown in FIG. 1. A sequence of the bus stations such as that illustrated in FIG. 1 may be in the order 1, 2, 3, 4, 5 and 6 or in the order 6, 5, 4, 3, 2, 1. Therefore, in addition to position information 13, a direction vector 12 is also provided, indicating whether the order is run through in a first direction of 1 to 6 (up path) or in a second direction opposite the first direction, i.e., from 6 to 1 (down path).

Thus, information about a sequence of the bus stations is stored in the bus stations, making it possible for the bus stations themselves to determine their own position within this sequence. The communications contain information on the basis of which it can be determined which station is the transmitting station for the communication within the sequence and in which direction the sequence is to be run through. On the basis of the information thus present in the bus stations themselves and in the communications, the bus stations coordinate the data exchange.

Figure 3:
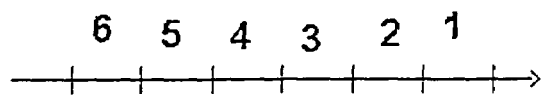
FIG. 3 shows a first sequence of time slots.

FIG. 3 illustrates the time frame for a data exchange triggered by bus station 6. To do so, a time axis is plotted with time slots assigned to each bus station provided on it. It is first assumed that none of bus stations 1–6 is transmitting a communication. Then in a first time slot, bus station 6 transmits a communication as indicated in FIG. 2. This communication contains a data packet 11 which is to be relayed to all the bus stations. In addition, a direction vector 12 is provided, pointing in the down direction here, because the sequence is to be run through starting from bus station 6 down to bus station 1. In addition, the communication contains position information, namely the number 6 in this case for the sake of simplicity. The communication is transmitted by bus station 6 in the form of a suitable radio signal and it reaches bus stations 2, 3, 4 and 5 over communications links 14 essentially simultaneously. Differences in transit time of the radio signal are negligible here, because it is assumed that the distance between the bus stations is not very great. On the basis of the resulting information, each of bus stations 2, 3, 4 and 5 calculates the time grid as shown in FIG. 3. The length of each time slot is determined on the basis of the length of the communication transmitted by bus station 6. On the basis of position information 13, all bus stations that have received the communication know that after the communication from bus station 6, a time slot is then provided for bus station 5, after the time slot for bus station 5, a time slot is provided for bus station 4, then a time slot is provided for bus station 3, then a time slot is provided for bus station 2, and finally a time slot is provided for bus station 1. All the bus stations are designed so that they also transmit the received communications in the time slot provided for them. The same data packet is used as in the original communication of bus station 6. The position information is adapted accordingly to the transmitting bus station, i.e., bus station 5 correspondingly transmits a 5 for position information 13, bus station 4 transmits a 4, etc. In addition, direction vector 12 is not altered for the example illustrated in FIG. 3, so that here again, all the bus stations are using a down direction vector.

After bus station 6 has transmitted its communication, in the next time slot bus station 5 transmits a corresponding communication with position information 13 for bus station 5, a down direction vector 12 and original data packet 11. This communication from bus station 5 is also received by bus station 1, so that now all the bus stations have received the data packet originally sent by bus station 6. Therefore, there is no sense in any other repetitions of this data packet in the time slots for stations 4, 3, 2 and 1 for the case presented here because the information has already been distributed over the entire network of bus stations 1–6. However, individual bus stations or connecting lines 14 may fail. In this case, the multiple repetitions of the same communication ensure that the communication will reach all the intact bus stations. For a first example, it is assumed that there is a disturbance in the communications link between bus stations 1 and 5. In this case, a communication starting from bus station 6 could not reach bus station 1 via bus station 5. However, since bus station 1 still has another communications link 14 with bus station 4, and since bus station 4 repeats the communication once again in the proper time frame, bus station 1 still receives over communications link 14 to bus station 4 the communication originally sent by bus station 6. The same thing would happen if bus station 5 failed. After the communication was sent by bus station 6, it would not be repeated by bus station 5 in time slot 5, so that bus station 1 would not receive the communication from bus station 6 by way of bus station 5. Accordingly, bus station 1 here would again receive the communication by way of bus station 4. The communication system created in this way is thus capable of guaranteeing that communications are distributed throughout the entire communication system even in the event of a failure of individual bus stations 1 through 6 or individual communications links.

Figure 4:
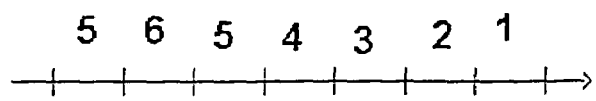
FIG. 4 shows a second sequence of time slots.

On the basis of a time line where individual time slots are assigned to the bus stations, FIG. 4 shows again how a communication is distributed in the communication system starting from bus station 5. When all communications links 14 and all bus stations 1 through 6 are functioning properly, it is sufficient if bus station 5 sends a communication containing position information 13 indicating that the communication from bus station 5 and a down direction vector 12. Then in the first step, bus stations 1, 3, 4 and 6 would receive the communication thus transmitted and would calculate a time grid corresponding to that in FIG. 3. Then the communication would be repeated by bus station 3 in the respective time slot and would thus also be sent to bus station 2. However, bus station 6 would not repeat the communication, because no time slot is provided for this. Therefore, in the event of a failure in bus station 3, it would be impossible to ensure that the communication would also reach bus station 2. Therefore, all the bus stations that do not represent highest bus station 6 provide the communications first with an up vector pointing to a sequence starting with the smallest number 1 up to the highest number 6. Bus station 5 thus transmits a communication having an up vector 12 and position information 5. This communication defines time slot 7 on the time line in FIG. 4, which then defines the length of the time slot for all the following bus stations and also defines the relative position of the time slots on the basis of the sequence. The communication would then be repeated by bus station 6, although it uses a down vector 12. On the basis of this communication, the sequence of the additional time slots then corresponds to the sequence of time slots as already described in the figure itself. Each bus station, apart from highest bus station 6, thus starts the distribution of communications in the bus system first with an up vector 12.

Figure 5:
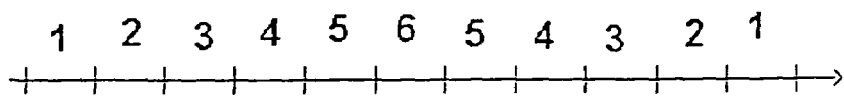
FIG. 5 shows a third sequence of time slots.

This is illustrated in FIG. 5 for the case when a communication from bus station 1 is distributed throughout the entire bus system. By sending a communication with position information 13, indicating bus station 1, an up direction vector 12 and a data packet 11, a first time slot 1 is defined and is then considered a reference time slot for all the following bus stations. No communications are sent in following time slots 2 and 3, because bus station 1 only has communications links 14 with bus stations 4 and 5. Nevertheless, these bus stations 4 and 5 wait until the time slots intended for them come up, at which point they then repeat the communications. Then bus stations 4 and 5 send communications with corresponding position information 13 and up vectors 12 in time slots 4 and 5. Then as soon as bus station 6 sends the communication in its time slot, the remaining sequence in FIG. 5 corresponds to the transmission sequence already described in conjunction with FIG. 3. After this point in time, it is also certain that the communication will be distributed throughout the entire communication system as long as there is a disturbance in no more than one connection or one bus station.

A disturbance in a bus station may include, for example, the fact that radio interference has occurred in the respective time slot assigned to that bus station. However, if radio interference occurs in one of time slots 5 through 1 in FIG. 3, it is nevertheless certain that the communication will be distributed throughout the entire communication system. If radio interference occurs during time slot 5, the communication is nevertheless repeated, for example, because station 4 has already received the communication in time slot 6 and it is therefore repeated in the time slot assigned to that station. However, it could be problematical if radio interference occurs in a first time slot 1 in the sequence described in FIG. 5. Therefore, all bus stations transmitting a communication with an up vector 12 also monitor whether other bus stations are sending communications containing identical data packet 11 on the basis of the communication sent by them. If this does not happen within a predetermined period of time, the bus stations resend the communications. Bus station 1 thus waits to see whether a communication corresponding to the data packet of the communication originally transmitted by it is repeated within time slots 2, 3, 4, 5 or 6. If this is not the case, it repeats the communication either after a fixed preselected period of time or after a period of time calculated on the basis of other received communications. Thus, all the bus stations that have sent a communication with an up vector can monitor the communication system for whether a communication is repeated in synchronization with a corresponding data packet in the respective time slot.

Another possibility for handling errors and faults is for bus stations that have transmitted a communication having an up vector to repeat this communication in a time slot that would result from a communication with a corresponding down vector.

In the example according to FIG. 5, for example, bus station 5 could be designed so that after it has transmitted the communication with an up vector in the first time slot assigned to bus station 5, it will repeat the communication with a down vector accordingly in the next time slot for station 5 for a communication having a down vector. This would take place regardless of whether bus station 6 has sent a corresponding communication in its respective time slot 6. The communication system may also be designed so that all the bus stations having only a small number of connections, e.g., bus stations 1 and 2 according to FIG. 1, will check on whether communications with corresponding data packet 11 appear in the communication system, and a communication in the up path (i.e., a communication having an up vector 12) will also be repeated in the down path (i.e., with a down vector) by other bus stations that are connected to a larger number of other bus stations. For example, in the communication system according to FIG. 1, bus stations 1 and 2 could check on whether the communications are repeated and they could optionally repeat them with an up vector if no other bus station has repeated the communication. Bus stations 3 through 5 repeat the communications first with an up vector, and in a later time slot which is always synchronized accordingly the communication is repeated once again with a down vector. These stations do not monitor whether their communication is repeated by other stations. Bus station 6 here assumes a special position in that it sends only once on the basis of communications having an up vector, namely one communication having a down vector.

In addition, measures are provided to permit a resolution when two communications are fed into the communication system more or less simultaneously. In this case, there may be an overlapping radio transmission, where the individual radio signals cause mutual interference. To prevent this situation, the bus station calculates the remaining transit time of the communication for each communication received. This corresponds to the sequence of the time grid spanned by the communications. When one bus station receives two communications, it processes first only the communication having the shorter remaining transit time and stores the other communication in the buffer at first or it may not store it at all. This ensures that the communication having the shorter remaining transit time is processed with a higher priority.

Figure 6:
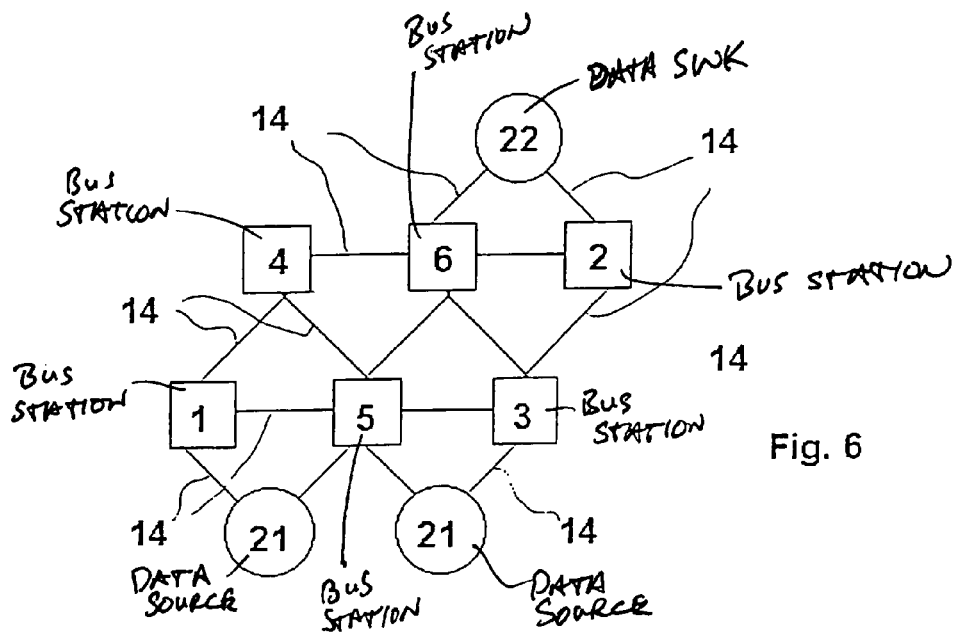
FIG. 6 shows a communication system in which data sources and data sinks are also provided in addition to bus stations.

In addition to bus stations 1 through 6, data sources 21 and data sinks 22 may also be provided, as shown in FIG. 6. FIG. 6 again shows the communication system composed of bus stations 1 through 6, that are connected to each other in the same manner, as already illustrated in FIG. 1. In addition, however, two data sources 21 and data sinks 22 are also shown, each being connected with in each case at least two communications links 14 to different bus stations 1 through 6 for reasons of transmission safety. Data source 21 is a device suitable for transmitting a radio signal.

Figure 7:
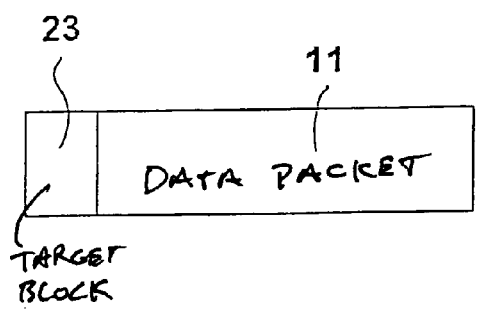
FIG. 7 shows the format of a communication of a data source.

Data source 21 may be, for example, a pushbutton which, when operated, sends a communication as illustrated in FIG. 7. The communication in FIG. 7 has a data packet 11 which corresponds to the data packet shown in FIG. 2. This data packet is then also used further by bus stations 1 through 6 for the communications exchanged between the bus stations according to FIG. 2. At the beginning, the communication has a target block 23. This target block 23 indicates bus station 1 through 6 for which the communication is intended. The data sources always address the highest bus station they can reach. As a result of this measure, only one bus station is always induced by the data source to relay the communications, and this bus station has the highest possible position in the relay chain. Data sources 21 monitor whether the bus stations are sending communications containing data packet 11 accordingly. If there is no corresponding repetition of the communication, the bus stations attempt again to transmit their communication to a bus station. An attempt is made either immediately after the first unconfirmed transmission or only after additional unconfirmed transmissions to reach a bus station with a lower position in the sequence. Data sources 21 shown in FIG. 6 will first attempt, for example, to send communications to bus station 5. If bus station 5 does not repeat the communication, either an attempt is made to reach bus station 5 again or bus station 1 or 3 is addressed. Before sending a communication, data sources 21 check on whether communications are already being sent in the communication system, because simultaneous transmission of communications leads to disturbances. If data sources 21 find before transmission that communications are already being relayed in the communication system, it will attempt to send its communication again at a later time. When a communication is received from another bus station or a data source having a data packet, a communication having the direction vector in the second direction and the data packet of the received communication may be sent. When a communication is received from another bus station or a data source having a data packet, a first communication having the same data packet and a direction vector in a first direction may be sent, and in a following time slot a second communication having the data packet of the received communication and the direction vector in a second direction may be sent.

In addition, FIG. 6 also shows a data sink 22. This data sink should be designed so that it has at least two communications links, i.e., at least two radio connections to two different bus stations. Such a data sink 22 is a radio receiver which can be addressed by data packet 11. This may be, for example, a lamp which can be switched on or off by a control signal. Such a data sink is designed simply as a passive station, i.e., it is designed only to receive communications and it can neither generate nor relay communications.

Figure 8:
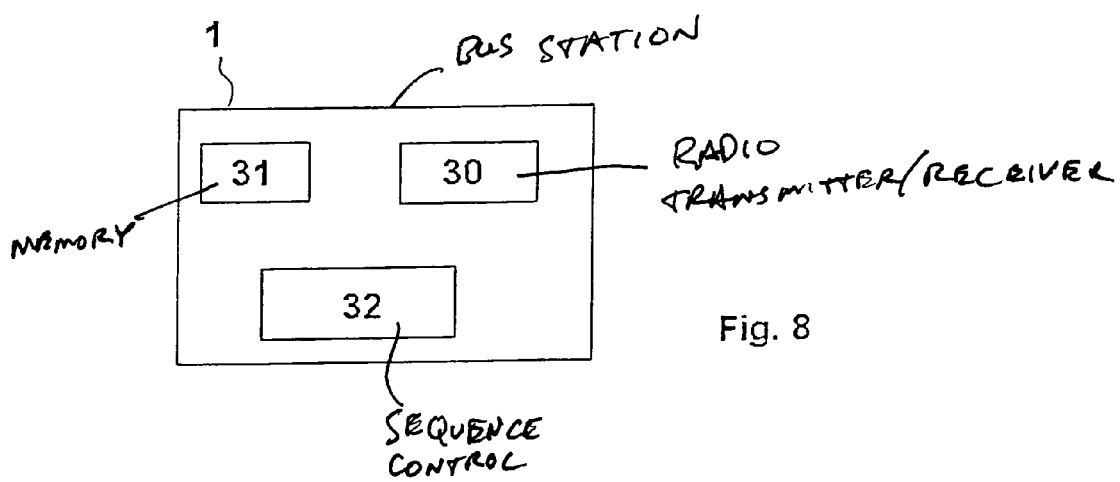
FIG. 8 shows the schematic diagram of a bus station, data source or data sink.

FIG. 8 shows as an example the design of a bus station 1. Bus station 1 has a radio receiver and radio transmitter 30 designed to exchange radio communications between bus stations 1 through 6 and data sources 21 or data sinks 22. In addition, there is a memory 31 where the information needed for communication can be stored. These may include, for example, one or more data packets 11, direction vectors 12 and items of position information 13. In addition, position information belonging to bus station 1 is also stored in memory 31. Sequence control 32 may be a microprocessor, for example, designed to process a suitable program which is stored in memory 31, for example. All the control signals for radio transmitter/receiver 30 required for communication can be generated in this way by this microprocessor. A data source 21 or a data sink 22 is also designed accordingly, with only one radio receiver 30 being provided with a data sink.

What is claimed is:

1. A bus station for exchanging with other bus stations a communication including a data packet and transmission information, comprising:
    an arrangement for storing position information of the bus station in relation to a sequence of bus stations;
    an arrangement for determining, from the transmission information, position information of the one of the bus stations that is transmitting;
    an arrangement for, on receiving the communication, determining a time slot belonging to the bus station on the basis of the position information of the one of the bus stations that is transmitting and the position information of the bus station;
    an arrangement for sending the communication including the data packet after the data packet is received, the communication being sent in a next time slot belonging to the bus station;
    an arrangement, in transmitting the communication, for using the direction vector of the received communication;
    an arrangement, after the communication has been sent, depending on the direction vector, for checking on whether another bus station has repeated the data packet sent in the communication; and
    an arrangement for sending the communication again if no other bus station has repeated the sent data packet;
    wherein the communication includes a direction vector indicating that a sequence will be run through in one of a first direction and a second direction that is opposite to the first direction.

2. The bus station according to claim 1, further comprising:
    an arrangement capable of receiving another communication including another data packet of a data source; and
    an arrangement for sending, on receiving a communication from the data source, a communication with the other data packet to the other bus stations.

3. The bus station according to claim 1, further comprising:
    an arrangement by which, when a communication is received from one of another bus station and a data source having a data packet, a first communication having the same data packet and a direction vector in a first direction can be sent, and in a following time slot a second communication having the data packet of the received communication and the direction vector in a second direction can be sent.

4. The bus station according to claim 1, further comprising:
    an arrangement by which, when a first communication including the data packet is received and a second communication is received after the first communication but before a sending of another communication containing the received data packet of the first communication, on the basis of the transmission information, a length of the data packet, and a direction vector, a remaining residual transit time of the first and second communications can be calculated, and only the one of the first and second communications having a shorter remaining transit time is processed further.

5. The bus station according to claim 1, wherein:
    when the direction vector is in the first direction, a repetition of the data packet is monitored; and
    when the direction vector is in the second direction, the repetition of the data packet is not monitored.

6. The bus station according to claim 5, further comprising:
    an arrangement for sending a communication with the direction vector in the first direction when a communication is received from a data source.

7. The bus station according to claim 5, wherein if the sequence of bus stations in the first direction terminates in the bus station, then the bus station has a number of connections to other bus stations one of greater than and equal to any other bus station.

8. The bus station according to claim 7, wherein, after the bus station receives the communication with data packet and the direction vector, the bus station sends the communication with the data packet and an opposite direction vector.

9. The bus station according to claim 5, wherein if the sequence of bus stations in the second direction terminates in the bus station, then the bus station has a number of connections to other bus stations one of less than and equal to any other bus station.

10. The bus station according to claim 9, wherein, after the bus station receives the communication with data packet and the direction vector, the bus station does not send the communication with the data packet.

* * * * *